(12) United States Patent
S. R et al.

(10) Patent No.: US 12,374,212 B2
(45) Date of Patent: Jul. 29, 2025

(54) SYSTEMS AND METHODS FOR AUGMENTING REALITY DURING A SITE SURVEY USING AN UNMANNED AERIAL VEHICLE

(71) Applicant: Honeywell International Inc., Charlotte, NC (US)

(72) Inventors: Sasikumar S. R, Salem (IN);
Gowrishankar M. R, Bangalore (IN);
Ranjith Kumar P, Bangalore (IN);
Kingslin Joseph, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 1089 days.

(21) Appl. No.: 17/094,366

(22) Filed: Nov. 10, 2020

(65) Prior Publication Data
US 2021/0090428 A1     Mar. 25, 2021

Related U.S. Application Data

(62) Division of application No. 15/864,172, filed on Jan. 8, 2018, now Pat. No. 10,832,558.

(51) Int. Cl.
*G08B 25/10*     (2006.01)
*G05D 1/00*     (2024.01)
(Continued)

(52) U.S. Cl.
CPC .......... *G08B 25/10* (2013.01); *G05D 1/0038* (2013.01); *G06F 16/245* (2019.01);
(Continued)

(58) Field of Classification Search
CPC .... G08B 25/10; B64C 39/024; G05D 1/0038; G06F 16/245; G06T 19/006;
(Continued)

(56) References Cited

U.S. PATENT DOCUMENTS

| 9,085,363 | B2 * | 7/2015 | Tofte | G06Q 40/00 |
| 10,340,983 | B2 * | 7/2019 | Liu | H04B 3/46 |

(Continued)

FOREIGN PATENT DOCUMENTS

GB     2519744     5/2015

OTHER PUBLICATIONS

Ham et al. Visualization in Engineering (2016). Visual monitoring of civil infrastructure systems via camera-equipped Unmanned Aerial Vehicles (UAVs).*

(Continued)

*Primary Examiner* — Peter D Nolan
*Assistant Examiner* — Anwar Mohamed
(74) *Attorney, Agent, or Firm* — Brooks, Cameron & Huebsch, PLLC

(57) ABSTRACT

Systems and methods are provided for augmented reality during an automated site survey of a building using an unmanned aerial vehicle so that results of the site survey are substantially consistent, irrespective of whether the site survey is conducted when the building is bare or after systems and devices in the building are installed. Some methods can include retrieving a building information model of the building from a database device, receiving user input and, responsive thereto, transmitting navigation signals to the unmanned aerial vehicle to maneuver to a site survey position in the building and transmitting command signals to the unmanned aerial vehicle to conduct a RF test at the site survey position and return site survey results, and calculating signal degradation for the site survey position as a function of the site survey results and the building information model.

14 Claims, 1 Drawing Sheet

(51) Int. Cl.
*G06F 16/245* (2019.01)
*G06T 19/00* (2011.01)
*H04B 17/318* (2015.01)
*H04B 17/391* (2015.01)
*B64U 101/26* (2023.01)
*B64U 101/31* (2023.01)
*G08B 17/00* (2006.01)

(52) U.S. Cl.
CPC ......... *G06T 19/006* (2013.01); *H04B 17/318* (2015.01); *H04B 17/391* (2015.01); *B64U 2101/26* (2023.01); *B64U 2101/31* (2023.01); *B64U 2201/20* (2023.01); *G08B 17/00* (2013.01)

(58) Field of Classification Search
CPC ............... H04B 17/318; H04B 17/391; B64U 2101/00; B64U 2101/30; B64U 2201/20
See application file for complete search history.

(56) References Cited

U.S. PATENT DOCUMENTS

| | | | |
|---|---|---|---|
| 11,127,170 B1* | 9/2021 | Nevdahs | G06T 11/00 |
| 11,295,458 B2* | 4/2022 | Dasgupta | G06T 7/10 |
| 2010/0102983 A1* | 4/2010 | Plocher | G08B 25/08 |
| | | | 704/258 |
| 2014/0032034 A1* | 1/2014 | Raptopoulos | H04B 7/18506 |
| | | | 701/25 |
| 2015/0025788 A1 | 1/2015 | Crain et al. | |
| 2015/0304869 A1* | 10/2015 | Johnson | G05D 1/102 |
| | | | 455/67.11 |
| 2015/0312774 A1* | 10/2015 | Lau | G05D 1/102 |
| | | | 455/446 |
| 2015/0356482 A1* | 12/2015 | Whipple | G06Q 50/06 |
| | | | 705/7.23 |
| 2016/0127712 A1* | 5/2016 | Alfredsson | H04N 21/42202 |
| | | | 348/14.07 |
| 2016/0360428 A1 | 8/2016 | Priest | |
| 2016/0253808 A1* | 9/2016 | Metzler | B64C 39/02 |
| | | | 382/103 |
| 2017/0132567 A1* | 5/2017 | Glunz | G06T 17/05 |
| 2018/0158235 A1* | 6/2018 | Wu | G06T 19/20 |
| 2018/0357880 A1 | 12/2018 | Vijayakumari et al. | |
| 2022/0077891 A1* | 3/2022 | Liu | H04B 3/542 |

OTHER PUBLICATIONS

Stefanie, Augmented Reality for Construction Site Monitoring and Documentation (Jan. 20, 2014), Published in: Proceedings of the IEEE ( vol. 102, Issue: 2, Feb. 2014).*

* cited by examiner

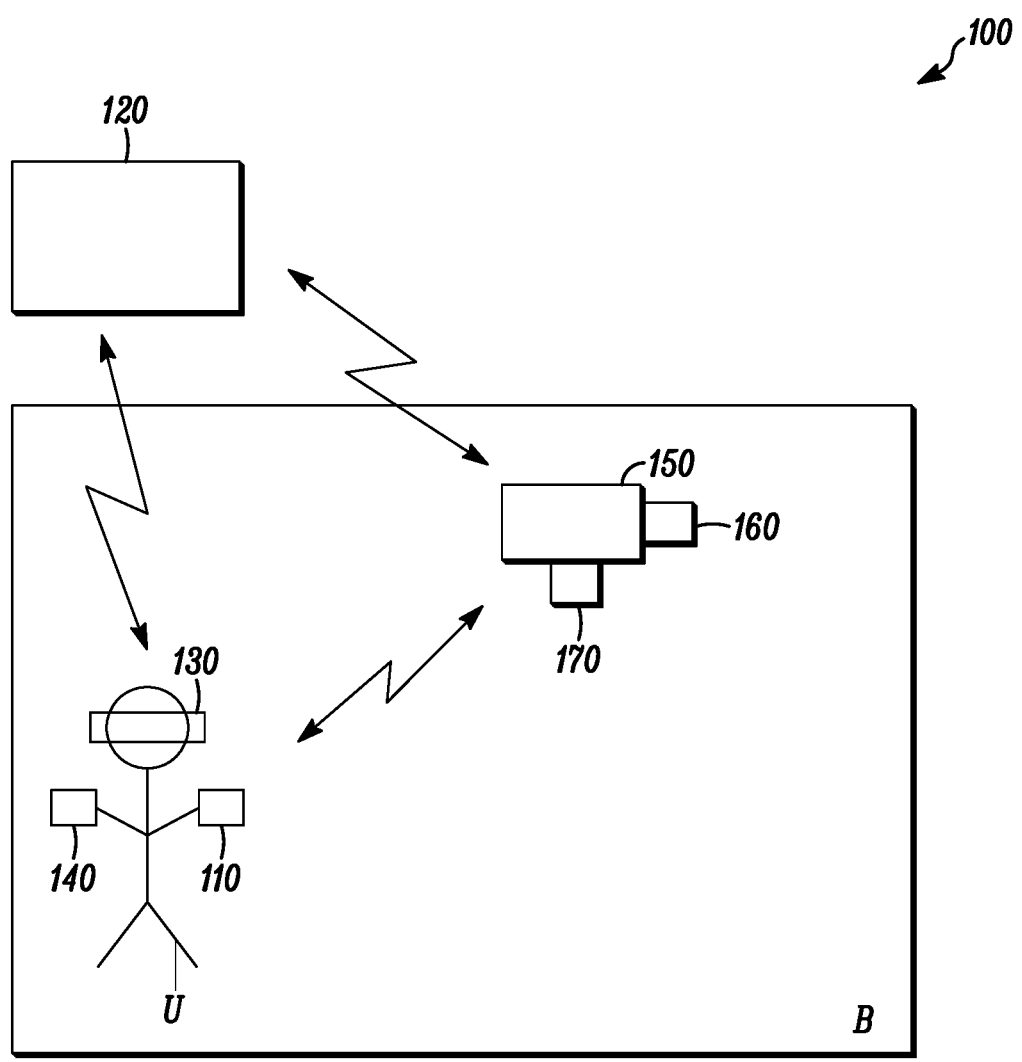

SYSTEMS AND METHODS FOR AUGMENTING REALITY DURING A SITE SURVEY USING AN UNMANNED AERIAL VEHICLE

PRIORITY INFORMATION

This application is a Divisional of U.S. application Ser. No. 15/864,172, filed Jan. 8, 2018 and published as US Publication No. 2019/0213865 on Jul. 11, 2019 and will issue as U.S. Pat. No. 10,832,558 on Nov. 10, 2020, the contents of which is incorporated herein by reference.

FIELD

The present invention relates generally to site surveys and unmanned aerial vehicles. More particularly, the present invention relates to systems and methods for augmented reality during a site survey using an unmanned aerial vehicle.

BACKGROUND

A site survey of a building is a known risk mitigation tool to estimate a bill of materials for a wireless fire alarm system that will be installed in the building and to understand a suitability of the wireless fire alarm system for the building. Accordingly, it can be desirable to conduct the site survey early in development and construction of the building so that any identified issues can be resolved in a timely manner. Indeed, it is possible to conduct the site survey when the building is bare, that is, when no systems or system devices, including HVAC ducts, sprinkler pipes, VA/PA speakers, wireless and electronic devices, and the like, have been installed in the building as yet. However, systems and system devices installed in the building cause changes to the building and an infrastructure thereof, thereby leading to results of the site survey varying drastically from results of commissioning the wireless fire alarm system. Indeed, there can be more variations between the results of the site survey and the results of the commissioning of the wireless fire alarm system according to how early the site survey is conducted relative to when the systems and the system devices are installed in the building, and there are no known recommendations as to when the site survey should be conducted or repeated.

Furthermore, the site survey has traditionally been a manual process requiring users to manually mark locations to mount the system devices and then carry a pole or a ladder with a fire alarm system device mounted thereon to those locations for testing, which can last upwards of an hour. When the testing involves a link test, such testing may require at least two users adjusting the locations of two fire alarm system devices towards and away from each other until user interface devices on the fire alarm system devices indicate that a desired RSSI value is obtained. Accordingly, the site survey can be long and present challenges in terms of efficiency, effectiveness, and productivity because the users become tired and often find problems in handling the pole or the ladder mounted with the wireless fire alarm system device.

In view of the above, there is a continuing, ongoing need for improved systems and methods.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for augmented reality during a site survey using an unmanned aerial vehicle. For example, systems and methods disclosed herein can augment the reality of a building during the site survey so that end results of the site survey are substantially consistent over time, irrespective of whether the site survey is conducted when the building is bare or after systems and devices in the building are installed. Furthermore, systems and methods disclosed herein can include a drone that can automate the site survey, thereby increasing the efficiency, effectiveness, and productivity of the site survey.

Systems and methods disclosed herein are described in connection with a wireless fire alarm system. However, it is to be understood that systems and methods disclosed herein are not so limited and can be used in connection with any ambient condition detection system, security system, access control system, or connected system with IoT devices as would be understood by one of ordinary skill in the art.

In some embodiments, systems and methods disclosed herein can include one or more of a cloud server device, a building information model (BIM) of the building stored in a database device, a mobile device, a handheld device, a USB dongle connected to the mobile device, a virtual reality wearable headset or glasses, an unmanned aerial vehicle (UAV or drone), a fire alarm system device carried by the UAV, and a camera or other image capture device carried by the UAV. For example, the mobile device can communicate, directly or via the USB dongle connected thereto, with the cloud server device, the database device, the UAV, the fire alarm system device, and the camera via a wireless network, such as the Internet, a LAN, or a cloud network, and can communicate, directly or via the USB dongle connected thereto, with the handheld device and the virtual reality wearable headset or glasses via a short range wireless communication medium, such as Bluetooth or NFC.

In some embodiments, the mobile device can retrieve the BIM either directly from the database device or via the cloud server and can receive user input identifying a marked location in the BIM. For example, the marked location can correspond to an installation location for the fire alarm system device in the building. Then, the mobile device, the handheld device, or the virtual reality wearable headset or glasses can receive user input and, responsive thereto, transmit navigation signals to the UAV to maneuver the UAV carrying the fire alarm system device and the camera to a site survey position within the building. Additionally or alternatively, in some embodiments, the mobile device, the handheld device, or the virtual reality wearable headset or glasses can receive user input and, responsive thereto, transmit navigation signals to make real time adjustments to a flight path of the UAV.

In some embodiments, the site survey position can correspond to the marked location and the installation location, the mobile device can instruct the UAV to maneuver to the site survey position by identifying the marked location in the BIM, and the UAV can remain stationary upon reaching the site survey position. Furthermore, in some embodiments, the mobile device can transmit command signals to the fire alarm system device to enter a site survey mode at the site survey position and conduct a RF test at the site survey position, can retrieve or receive site survey results from the fire alarm system device, and can process the site survey results or transmit the site survey results to the cloud server device for processing thereof.

For example, in some embodiments, the site survey results can include a RSSI value from the fire alarm system device, and the mobile device or the cloud server device can use the site survey position of and the installation location for the fire alarm system device to map the RSSI value to the marked location in the BIM, to extract elements in the BIM that have a potential to degrade the RSSI value were the fire alarm system device installed in the building with all systems and system devices installed therein, to calculate signal degradation for the installation location as a function of the RSSI value and the elements in the BIM that have the potential to degrade the RSSI value, and identify one or more changes to the marked location for improvement thereof, which can be transmitted to a user. Responsive thereto, the user can adjust the marked location in the BIM in real time, which, in a corresponding manner, can adjust the installation location and the site survey location and cause the UAV to maneuver to the site survey location as adjusted for continuing the site survey.

In some embodiments, the camera can capture an image during flight and/or at the site survey position and transmit the image to the mobile device for displaying on the virtual reality wearable headset or glasses and providing the user of the virtual reality wearable headset or glasses with an augmented real world view of the building, including real world obstacles in the building. For example, in some embodiments, the mobile device or the cloud server device can combine the BIM with the image from the camera to provide the user with the augmented real world view of the building.

It is to be understood that one or more of the cloud server device and the mobile device can include a transceiver device and a memory device, each of which can be in communication with control circuitry, one or more programmable processors, and executable control software as would be understood by one of ordinary skill in the art. In some embodiments, the memory device can store the BIM, and in some embodiments, the transceiver device can transmit and receive signals as described herein. In some embodiments, the executable control software can be stored on a transitory or non-transitory computer readable medium, including, but not limited to local computer memory, RAM, optical storage media, magnetic storage media, flash memory, and the like, and some or all of the control circuitry, the programmable processor, and the control software can execute and control at least some of the methods described herein.

FIG. 1 is a block diagram of a system 100 in accordance with disclosed embodiments. As seen in FIG. 1, the system 100 can include a mobile device 110 carried by a user U that can communicate with a cloud server device 120, a wearable user interface device 130, a handheld user interface device 140, a UAV 150, a test device 160 carried by the UAV 150, and an image capture device 170 carried by the UAV 150. It is to be understood that, in some embodiments, the wearable user interface device 130 and/or the handheld user interface device 140 can be a part of, rather than separate from a user interface device of the mobile device 110. It is to be further understood that the mobile device 110, the user U, the wearable user interface device 130, and the handheld device can be located within a building under test B as seen in FIG. 1 or remotely.

In some embodiments, the handheld user interface device 140 can communicate, directly or via the mobile device 110, with the UAV 150 to maneuver the UAV 150 through the building under test B and can communicate, directly or via the mobile device 110, with the cloud server device 120 to transmit commands thereto and receive signals therefrom. Furthermore, in some embodiments, the image capture device 170 can obtain an image of the building under test B from a site survey position in the building under test B and transmit the image, directly or via the mobile device, to the cloud server, and in some embodiments, the wearable user interface device 130 can communicate, directly or via the mobile device 110, with the cloud server device 120 to receive and display thereon an augmented real world view of the building under test B. For example, the augmented real world view can include the image of the building under test B captured by the image capture device 170 combined with a BIM stored on the cloud server device 120. Further still, in some embodiments, the mobile device 110 can communicate with the test device 160 to instruct the test device 160 to enter a site survey mode and transmit site survey results thereto. Then, the mobile device 160 or the cloud server device 120 (if the mobile device 160 transmits the site survey results to the cloud server device 120) can use the site survey results and the BIM to calculate signal degradation for the site survey position as a function of the site survey results and elements of the BIM that have a potential to degrade the site survey results.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   retrieving, via a mobile device, building information model (BIM) data of a building under test from a database device;
   receiving first user input and, responsive thereto, transmitting navigation signals to an unmanned aerial vehicle to maneuver to a site survey position in the building under test and transmitting command signals to the unmanned aerial vehicle to conduct a RF test at the site survey position and return site survey results;
   receiving, via the mobile device, image data taken by an image capture device located on the unmanned aerial vehicle within the building under test, the image data including an image at a site survey position within the building under test;
   conducting a radio frequency (RF) test at the site survey position and returning site survey results;
   calculating signal degradation for the site survey position as a function of the site survey results, the building information model, and one or more elements determined by at least one of the image data or in the BIM data that have the potential to degrade the signal, wherein the site survey results include a received signal strength indicator (RSSI) value obtained at the site survey position by a test device carried by the unmanned aerial vehicle;

combining the BIM data with the image data to create an augmented real world view; and displaying the augmented real world view of the building under test at the site survey position.

2. The method of claim 1 further comprising:

mapping the RSSI value to the site survey position in the building information model; and extracting elements in the building information model with a potential to degrade the RSSI value at the site survey position.

3. The method of claim 2 further comprising identifying one or more changes to the site survey position to improve the signal degradation of the RSSI value.

4. The method of claim 3 wherein the the test device conducts the RF test.

5. The method of claim 4 further comprising:

receiving second user input for identifying a marked location in the building information model corresponding to an installation location for the test device; and identifying the site survey position based on the marked location.

6. The method of claim 5 further comprising receiving third user input to adjust the marked location pursuant to the one or more changes and, responsive thereto, transmitting the navigation signals to the unmanned aerial vehicle to maneuver to the site survey position corresponding to the marked location as adjusted.

7. A method comprising:

retrieving via a mobile device, building information model (BIM) data of a building under test from a database device;

receiving user input and, responsive thereto, transmitting navigation signals to an unmanned aerial vehicle to maneuver to a site survey position in the building under test when the building under test is in a state of completion and transmitting command signals to the unmanned aerial vehicle to conduct a RF test at the site survey position when the building under test is in the state of completion and return site survey results responsive to the RF test at the site survey position when the building under test is in the state of completion;

receiving, via the mobile device, image data taken by an image capture device located on the unmanned aerial vehicle within the building under test, the image data including an image at a site survey position within the building under test;

combining the BIM data with the image data to create an augmented real world view;

displaying the augmented real world view of the building under test at the site survey position; and calculating signal degradation for the site survey position as a function of the site survey results, the building information model, and one or more elements determined by at least one of the image data or in the BIM data that have the potential to degrade the signal, wherein the site survey results include a received signal strength indicator (RSSI) value obtained at the site survey position by a test device carried by the unmanned aerial vehicle.

8. A system comprising:

a transceiver device;

a database device;

a user interface device;

a programmable processor; and executable control software stored on a non-transitory computer readable medium, wherein the programmable processor and the executable control software retrieve, via a mobile device, building information model data of a building under test from the database device, wherein the user interface device receives first user input, and responsive thereto, the transceiver device transmits navigation signals to an unmanned aerial vehicle to maneuver the unmanned aerial vehicle to a site survey position in the building under test and transmits command signals to a test device carried by the unmanned aerial vehicle to conduct a radio frequency (RF) test at the site survey position and return site survey results, wherein the transceiver device receives, via the mobile device, image data taken by an image capture device located on the unmanned aerial vehicle within the building under test, the image data including an image at a site survey position within the building under test, wherein the programmable processor and the executable control software calculate signal degradation for the site survey position as a function of the site survey results, the building information model, and one or more elements determined by at least one of the image data or in the BIM data that have the potential to degrade the signal, wherein the site survey results include a received signal strength indicator (RSSI) value obtained at the site survey position by the test device;

wherein the user interface device displays an augmented real world view of the building under test at the site survey position; and wherein the programmable processor and the executable control software combine the image data with the building information model data to create the augmented real world view.

9. The system of claim 8 wherein the programmable processor and the executable control software map the RSSI value to the site survey position in the building information model and extract elements in the building information model with a potential to degrade the RSSI value at the site survey position.

10. The system of claim 9 wherein the programmable processor and the executable control software identify one or more changes to the site survey position to improve the signal degradation of the RSSI value.

11. The system of claim 10 wherein the user interface device receives second user input for identifying a marked location in the building information model corresponding to an installation location for the test device, and wherein the programmable processor and the executable control software identify the site survey position based on the marked location.

12. The system of claim 11 wherein the user interface device receives third user input to adjust the marked location pursuant to the one or more changes and, responsive thereto, transmits the navigation signals to the unmanned aerial vehicle to maneuver to the site survey position corresponding to the marked location as adjusted.

13. The system of claim 8 wherein the user interface device includes a virtual reality wearable headset or glasses or a handheld device.

14. The system of claim 8 wherein the transceiver device communicates with the unmanned aerial vehicle and the test device via a first communication medium, and wherein the transceiver device communicates with the user interface device via a second communication medium.

* * * * *